UNITED STATES PATENT OFFICE.

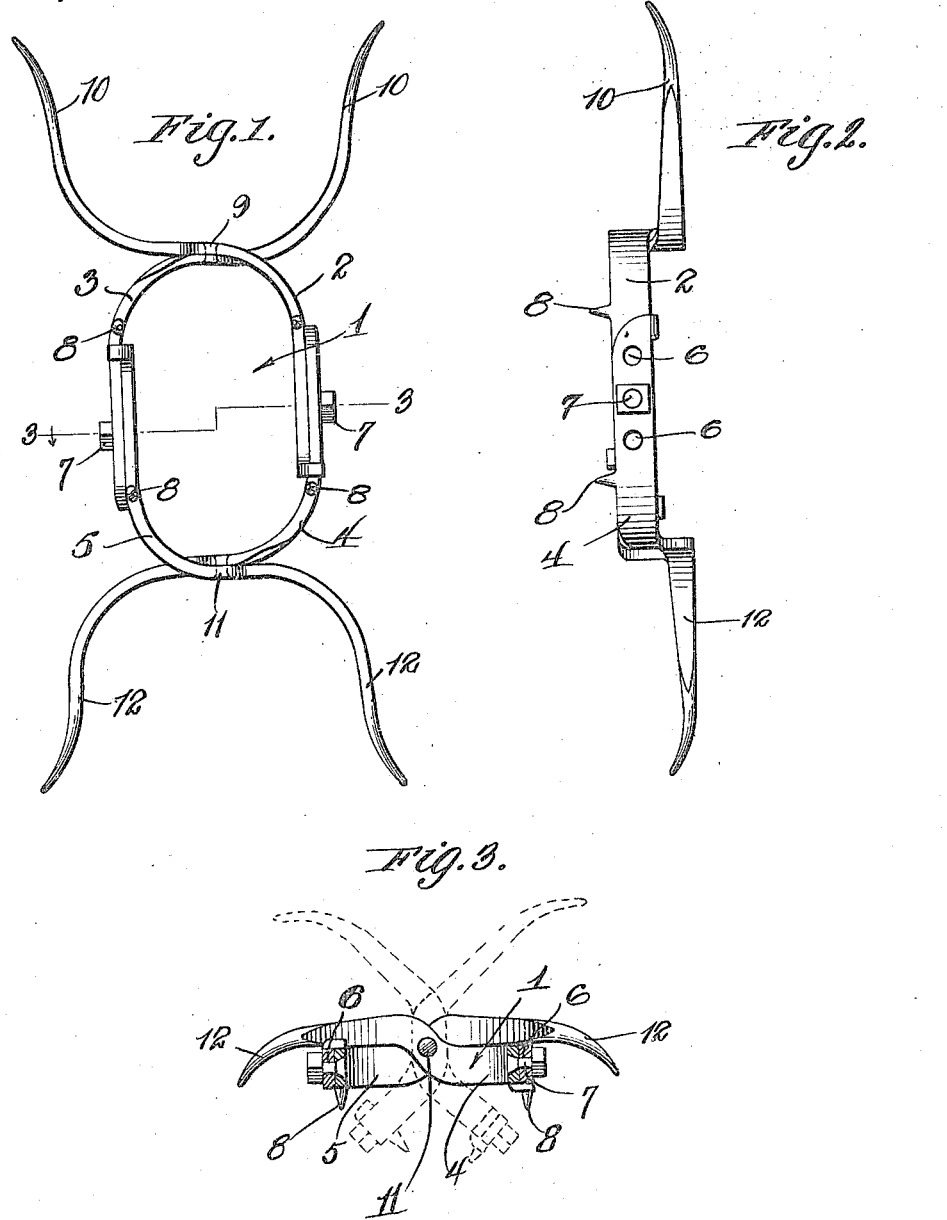

MANUEL H. TEETER, OF McWILLIE, OKLAHOMA, ASSIGNOR OF ONE-HALF TO RICHARD M. RALSTON, OF McWILLIE, OKLAHOMA.

ANIMAL-POKE.

1,255,246.  Specification of Letters Patent.  Patented Feb. 5, 1918.

Application filed January 17, 1917. Serial No. 142,885.

*To all whom it may concern:*

Be it known that I, MANUEL H. TEETER, a citizen of the United States, residing at McWillie, in the county of Alfalfa and State of Oklahoma, have invented certain new and useful Improvements in Animal-Pokes, of which the following is a specification.

This invention relates to an animal-poke and more particularly to a device designed to be attached to a cow or other animal that is inclined to climb fences or barriers or attempt to pass beneath bars of the fence or barrier forming the inclosure for the animal.

One of the objects of the invention is to provide a device of this character constructed in the form of a yoke adapted to be arranged on the neck of the animal in close proximity to its head and provided with means whereby any attempt to pass over the fence or under the bars thereof will result in a squeezing action on the animal's head which will cause it to withdraw from the fence and its attempt to get beyond the fence will thereby be frustrated.

As a further object of the invention the device includes the provision of a yoke having its sides pivotally connected and provided with prongs adapted to prod the animal when the sides of the yoke are moved together.

Another object of the invention is the provision of a device of this character having means for providing an adjustment whereby animals of different sizes may be fitted with the device.

A further object of this invention is the provision of an animal-poke which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a front elevation of the device in the position it will assume when mounted upon the neck of an animal.

Fig. 2 is a side elevation, and

Fig. 3 is a transverse section on the line 3—3 of Fig. 1, the dotted lines indicating the position of the device when in operation.

Referring to the drawing, wherein is illustrated the preferred form of my invention, and in which like numerals of reference indicate corresponding parts throughout the several views, the yoke, designated generally by the character 1 comprises the upper arms 2 and 3 and the lower arms 4 and 5. The proximate ends of these arms are arranged in pairs and are overlapped and provided with a series of openings 6. Each overlapping pair of arms has a fastening bolt 7 provided with a nut and this bolt 7 may be passed through any one of the openings for permitting longitudinal adjustment of the yoke whereby the same may be attached to various sizes of animals. The forward edges of the arms 2, 3, 4 and 5 are provided with integrally formed prongs 8 the purpose of which will be presently described. The terminal of each arm is provided with a lug overlapping the edge of the adjacent arm so that with the association of the bolt 7 each pair of arms will be prevented from moving after having been clamped in the proper adjusted position.

The upper arms 2 and 3 are curved inwardly and toward each other and are overlapped and pivotally connected together by the pivot pin 9. From this point the arms are extended outwardly and curved upwardly to provide the guard members 10. The arms 4 and 5 are constructed in the same manner as clearly shown by Fig. 3 of the drawing, they being provided with the pivot pin 11 provided at the overlapping portions of the arms 4 and 5. The terminals of the arms at this portion of the device are also curved outwardly and downwardly to provide lower guard members 12 similar to the guard members 10 at the upper portion of the device.

It will be obvious that when the animal attempts to climb over a fence or barrier the guard members 12 will strike the barrier and be forced rearwardly and toward each other as indicated by dotted lines in Fig. 3. This action will move the sides of the yoke 1 toward the head of the animal and the prongs 8 will prod the flesh until the animal withdraws from the fence. The same action will occur when the animal attempts to pass under the bar since the upper guard members 10 will act in the same manner as the lower guard members 12.

From the foregoing it will be observed that a very simple and durable animal-poke has been provided, the details of which embody the preferred form. I desire it to be understood however, that slight changes in the minor details of construction may be made without departing from the spirit of the invention or the scope of the claims hereunto appended.

I claim:

1. An animal poke comprising a yoke including upper and lower pairs of arms having their proximate ends overlapped and slidably adjustably connected together, each pair of arms at the top and bottom of the yoke being overlapped and pivotally connected together from which pivot point each arm is curved providing upper and lower guard members laterally spaced apart and movable toward each other to actuate the said overlapped portions of the arms.

2. An animal-poke comprising a yoke including a pair of arms at each side of the said yoke, the ends of each pair of arms being overlapped and provided with apertures, fastening elements extended through the apertures, the terminal of each arm being provided with a lug overlapping the edge of the adjacent arm, prongs formed on the forward edges of the said arms, the said arms at each end of the yoke being curved toward each other and pivotally connected together, and guard members formed on the terminals of the said arms.

3. An animal poke comprising a plurality of arms of similar formation arranged in pairs, each arm having an offset portion, the offset portions in each pair being overlapped and pivotally connected together, the proximate ends of the arms also being overlapped and adjustably connected together, the terminals of the arms in each pair being laterally spaced apart and curved to provide upper and lower guard members.

In testimony whereof I affix my signature in presence of two witnesses.

MANUEL H. TEETER.

Witnesses:
MACK PORTER,
ELLA SUTTER.

Copies of this patent may be obtained for five cents each, by addressing the "Commissioner of Patents, Washington, D. C."